United States Patent Office 3,360,988
Patented Jan. 2, 1968

3,360,988
ELECTRIC ARC APPARATUS
Howard A. Stine, Palo Alto, Charles E. Shepard, Sunnyvale, and Velvin R. Watson, San Jose, Calif., assignors to the United States of America as represented by the Administrator of the National Aeronautics and Space Administration
Continuation of application Ser. No. 366,669, May 11, 1964. This application Nov. 22, 1966, Ser. No. 596,338
12 Claims. (Cl. 73—147)

ABSTRACT OF THE DISCLOSURE

A stable, high-enthalpy constricted-arc heater with a supersonic nozzle and a fixed arc length. The anode, a circumferentially segmented-ring electrode, is downstream from the nozzle and electrically insulated from it. A diffuse, regulated current flow with axial symmetry, unaffected by gas flow, is produced.

---

The invention described herein may be manufactured and used by or for the Government of the United States of America for governmental purposes without the payment of any royalties thereon or therefor.

This invention relates to electric arc apparatus and more particularly to a high temperature wind tunnel in which the heat is provided by an electric arc.

In modern technology there is a growing need to create extremely high temperature for performing a variety of functions. One of these functions is to test materials and surface configuration under conditions which simulate the conditions which will be experienced in space flight or supersonic flight within the earth's atmosphere or the atmosphere of other planets. For example, there is a present need to simulate the environments to be encountered by rocket probes upon entry into the atmospheres of Mars and Venus, which environments have been determined to involve enthalpy on the order of 50,000 B.t.u./lb. Although electric arcs have heretofore been proposed for heating wind tunnels, the prior embodiments have not been capable of providing the magnitude of enthalpy which is now desired.

Accordingly, an object of the invention is to provide a wind tunnel having an electric arc heating arrangement which will provide higher enthalpy in the region of the location of the test specimen that has heretofore been possible. A related specific object is to provide a wind tunnel capable of providing enthalpy on the order of 50,000 B.t.u./lb. in the region of the location of the test specimen.

Some prior art structures have provided high temperatures for short duration or pulse type flow or for low pressure, or for low rates of continuous flow. However, none has provided the presently desired magnitude of high temperature gas and which can be provided continuously at high pressure and high flow rate.

Accordingly, another object of the invention is to provide a wind tunnel which is capable of continuously producing high-temperature gas with high pressure and high flow rates as well.

A further object of the invention is to provide a combination supersonic nozzle and arc electrode structure. The term supersonic nozzle is used throughout the specification and claims to define a nozzle having a small diameter throat or constrictor portion and a larger diameter effuser portion downstream of the constrictor portion and having the property that when sufficient differential gas pressure is provided across the nozzle, the gas velocity in the effuser will be supersonic.

More specifically, a further object of the invention is to provide an electric arc apparatus and constrictor-supersonic nozzle so arranged that steady gas flow is obtained without any disturbance such as may be caused when a supersonic nozzle and an electric arc are displaced from each other along the gas flow path.

An additional object of the invention is to provide an electric arc apparatus having means for insuring uniform distribution of current on an arc electrode in order to overcome the problem of local hot spots.

A further object of the invention is to provide improved electric arc apparatus of the type described which can be used wherever an extremely high temperature gas is required, as for example in melting or cutting.

By way of brief description the objects of the invention are achieved in one specific embodiment comprising arc electrodes spaced along the apparatus with a supersonic jet nozzle positioned between the electrodes. The arc anode forms the downstream end of the jet nozzle to provide steady gas flow. The nozzle comprises an elongated small diameter passage called a constrictor through which the arc and the gas flows. This arrangement forces the gas to flow near the arc where the gas is heated to high temperature and eventually becomes a part of the arc.

Other and further objects and features of advantage will be apparent from the following detailed description wherein reference is made to the accompanying drawings in which.

Figure 1:
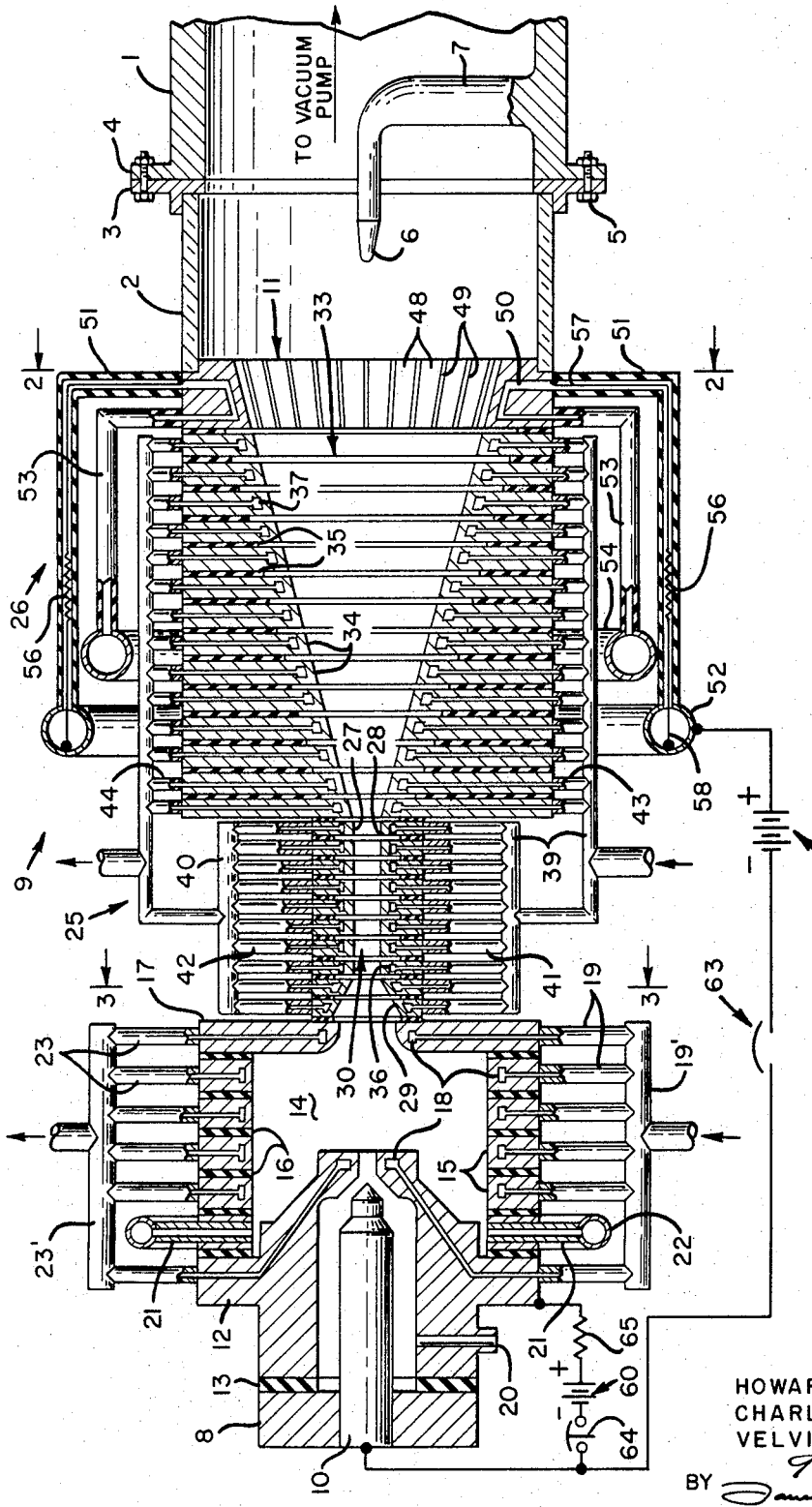
FIGURE 1 is a partly schematic cross-sectional view of a wind tunnel incorporating an electric arc according to the invention.
Figure 2:
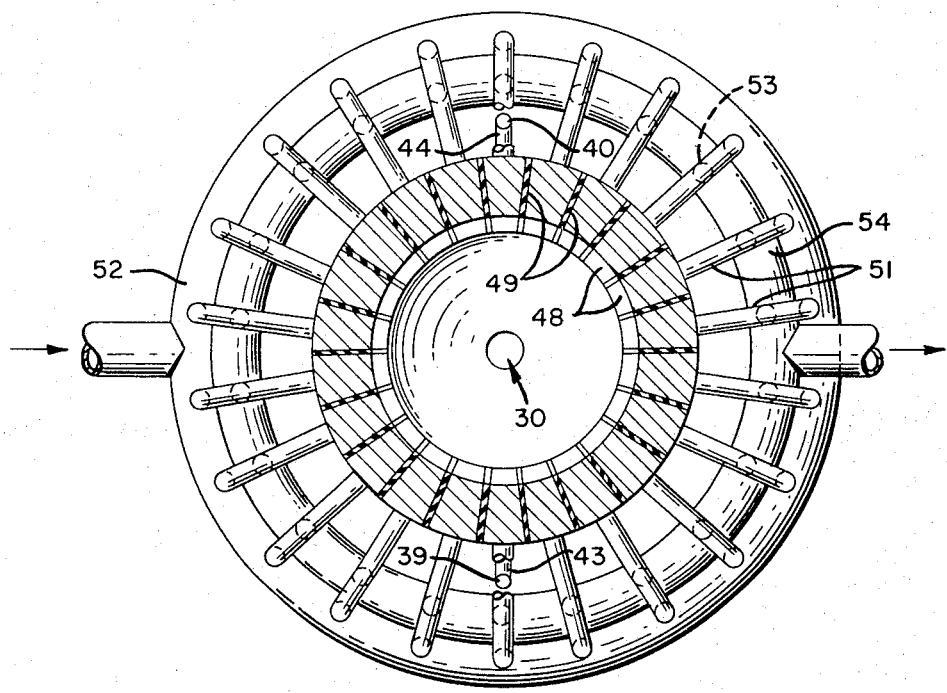
FIGURE 2 is a cross-sectional view taken on the line 2—2 of FIG. 1.

Referring to the drawings in more detail, FIG. 1 shows a wind tunnel comprising the electric arc apparatus and suitable auxiliary equipment for holding the test specimen and viewing the tunnel operation. The tubular section 1 is adapted to carry the test specimen, and an adjacent tubular transparent window 2 is provided for viewing the test specimen. A mounting collar 3 is attached to the end of the window and a matching collar 4 is carried by the test section 1 for easy insertion and replacement of various test specimens. Collars 3 and 4 are joined together by a plurality of bolts 5. In the specific embodiment shown in FIG. 1 the test specimen comprises an element 6 which is made of a specific material and in a specific shape to determine the effects of high velocity, high temperature gas flow past the specimen. The specimen is mounted on a support pedestal 7. The right end of the test section 1 is connected to a vacuum pump (not shown) or other conventional vacuum system.

The apparatus for heating the air in the wind tunnel is shown to the left of the transparent section 2. More specifically, the heating apparatus comprises an electric arc structure having an arc cathode 10 at its upstream end and an arc anode 11 at its downstream end. A constrictor-supersonic nozzle 9 is positioned intermediate the arc cathode and anode.

The cathode end of the apparatus comprises a plurality of annular sections coaxial with the cathode rod 10. The cathode rod, which is preferably made of thoriated tungsten, is mounted on an end ring 8 which is separated from an annular metal electrode 12 by means of a ring of electrical insulating material 13. A cylindrical plenum chamber 14 is formed by a plurality of alternate water-cooled metal and insulating rings 15 and 16 respectively. The downstream end of the plenum chamber is formed by an apertured end wall 17 which opens to the upstream end of the constrictor-supersonic nozzle 9. Each of the members 12, 15 and 17 is provided with a cooling passage 18, and each of the passages is served by an inlet pipe 19 and an outlet pipe 23, connected respectively to an inlet manifold 19' and an outlet manifold 23'. An inlet port 20 is provided in member 12 to permit the introduction of the shield gas such as nitrogen into the annular space around the cathode 10. Similarly, the plenum chamber is provided with a plurality of inlet pipes 21 which are fed with a high pressure gas inlet manifold 22.

Figure 3:
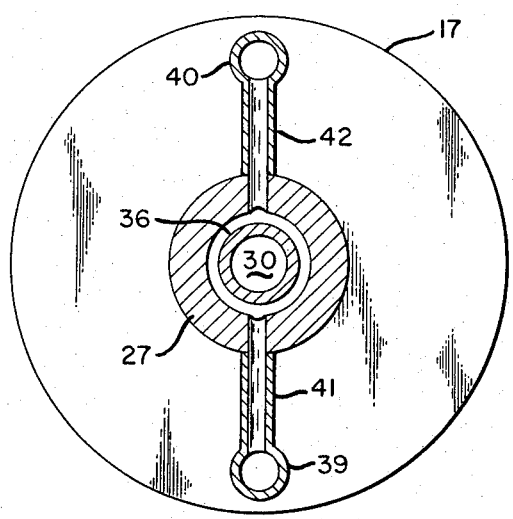
FIGURE 3 is a cross-sectional view on an enlarged scale taken on the line 3—3 of FIG. 1.

The supersonic nozzle 9 comprises a constrictor portion 25 and an effuser portion 26. The constrictor portion or tube is formed by a plurality of alternate metal rings 27 and electrical insulating rings 28. The electrical insulating rings 28 are made of a high thermal conductivity ceramic, such as boron nitride, and are cooled by conduction to the water-cooled rings 27. The inlet to the constrictor can be tapered as shown by the line 29. However, the term constrictor relates specifically to the constant diameter portion which forms an elongated, small diameter passage 30. The effuser portion of the supersonic nozzle is shaped to provide a diverging outlet passage 33. More specifically, the passage is formed by a plurality of alternate metal rings 34 and electrical insulating rings 35. As in the case of the constrictor portion, the insulating rings 35 are cooled by conduction to the water-cooled effuser rings 34. The metal rings 27 and 34 are each provided with a cooling channel 36 and 37 respectively. The arrangement of the cooling channels in the rings 27 and 34 is similar and is shown by way of example for rings 27 in FIG. 3. The cooling passages are supplied by an inlet manifold 39 and an outlet manifold 40. Each of the constrictor rings 27 is provided with an inlet pipe 41 connected to the inlet manifold and an outlet pipe 42 connected to the outlet manifold. Similarly, each of the effuser rings is provided with an inlet pipe 43 connected to the inlet manifold and an outlet pipe 44 connected to the outlet manifold.

The use of water-cooled metal rings 27 and 34 is an important aspect of the construction because it has been found that the amount of heat energy or enthalpy which can be pumped into the electric arc increases with an increase in the rate of heat transfer from the envelope edge of the arc. It is also important that the metal rings 27 and 34 not form a continuous electrical conducting surface because the supersonic nozzle is made so long that the current flow would take the easier path along a continuous metal surface rather than through the gas as is desired. For the above reason it is necessary that the pipes 41, 42, 43 and 44 which connect the constrictor and effuser disks to their respective manifolds be electrically insulated from each other; for example, by making the manifolds 39 and 40 of electrically non-conducting material.

One important feature of the invention is that the anode is located downstream of the supersonic nozzle. In prior wind tunnels heated with arcs, the entire arc including the end anode was located upstream of the supersonic nozzle. The arrangement of the anode downstream of the nozzle requires that the arc pass entirely through the nozzle. The reason for providing a constricting portion is that the gas within a constricted arc is much hotter than the gas within an unconstricted arc. The reason for providing a substantial length of constrictor section is that more of the gas flowing through the constrictor can be forced to become very hot and part of the arc column by increasing the constrictor portion beyond what is normally required simply to provide supersonic conditions. In prior wind tunnels wherein the entire arc is placed upstream of the supersonic nozzle, much of the heat within the gas is dissipated to the nozzle walls. With the anode located at the downstream end of the nozzle, the gas heating process continues throughout the entire length of the nozzle so that the gas has very little time to dissipate heat prior to impinging on the model. Although these features are achieved in large measure even if the anode is spaced downstream from the end of the effuser, the optimum arrangement is as shown in the drawings with the anode contiguous to the end of the supersonic nozzle and even preferably shaped to form a continuation of the effuser shape.

Another important aspect of the anode has to do with the heating problem. The anode heating problem has two aspects. One is that since the anode forms the terminal end of the arc it is inherently subject to tremendous heating. A more subtle aspect of the problem is that it has been found that since it is virtually impossible to construct and maintain the anode to have absolutely perfect uniformity around its annulus and because of other non-symmetrics in the apparatus, the arc tends to concentrate at localized areas on the anode. When such localization occurs it causes tremendous concentration of energy which results in burning out the anode. The heating problem is solved according to the invention by constructing the anode not as a continuous electrically conducting member but as a plurality of electrically conducting metal segments 48 separated by electrical insulating spacers 49. The various metal and insulating segments and rings described throughout the apparatus can be joined together in any conventional manner. For example, the parts can be held together by tension rods and bands, or the insulating parts can be metalized and then brazed to the adjacent metal parts. Copper is a suitable material for the metal parts and boron nitride is a suitable material for the insulating parts. Each of the metal anode segments 48 is provided with a cooling water passage 50 which is serviced by an inlet pipe 51 from an inlet manifold 52 and an outlet pipe 53 to an outlet manifold 54. The full benefit of the segmented anode construction is achieved by use of a ballast resistor 56 for each of the segments 48, as will be hereinafter described in more detail. The resistors 56 are preferably located in the inlet pipes 51. One lead 57 for each resistor 56 is connected to its respective metal section 48 and the other end lead 58 is connected to the inlet manifold 52. As will be understood by those skilled in the art, the inlet pipes 51 are made of nonconductive material such as plastic so that the only electrical connection between each metal anode segment 48 and the metal inlet manifold 52 is through the respective resistor 56 and its leads 57 and 58. Also, as will be understood by those skilled in the art, the water employed in the cooling pipes 51 and 53 is pure water which is relatively nonconductive. Similarly the pipes 53 are made of nonconductive plastic so that the metal anode segments 48 are isolated from each other.

The basic electrical operating system is shown schematically in FIG. 1. The system comprises a first voltage source 60 connected between the cathode end and the annular electrode 12. An additional voltage source 61 is connected between the cathode 10 and the inlet manifold 52 which also serves as a bus for the anode segments 48 through the ballast resistors 56. Circuit breakers 63 and 64 are preferably provided in the line to protect against any possible overload condition. In operation, the inlet pipe 20 is connected to a source of shielding gas such as nitrogen; the manifold 22 is connected to a source of high pressure gas such as air; and the downstream end of the test section 1 is connected to a vacuum pump or other vacuum systems. The voltage source 60 which is connected to the cathode 10 and the electrode 12 permits an arc to be initiated. A suitable ballast resistor 65 limits the arc to a relatively low amperage. The purpose of this arc is to provide a source of sufficiently ionized gas to initiate the main arc between the cathode 10 and the multiple anode 11. After the main arc is started the pilot arc between the cathode 10 and the electrode 12 can be extinguished by opening breaker 64. At this time it is permissible to start the main flow of high pressure gas through manifold 22.

As previously described, the arc current often becomes localized on a continuous metal anode. In contrast, the separate segment construction for anode 11 requires that the arc current be uniformly distributed among the anode segments. Such distribution does not occur automatically but is required by the presence of the ballast resistors 56. More specifically, if the arc current were to tend to concentrate in any one of the anode segments 48, the current through the associated resistor 56 would tend to increase and therefore the potential drop across the resistor would increase. As a result, the voltage on the high current segment 48 would become less than the voltage on the other segments and the arc would be more attracted to the other segments than to the one it had originally chosen. Thus, the arc tends to distribute evenly among the anode segments, and any attempt to concentrate on any one segment is self-correcting.

Although specific details of the present invention are shown and described herein, it is to be understood that modifications may be made therein without departing from the spirit and scope of the invention as set forth in the appended claims. For example, the invention is not limited to rod-shaped tungsten cathodes. More specifically, the cathode rod 10 could be replaced by an annular array of copper segments electrically insulated from each other to form a construction similar to the annular anode construction, and preferably even including suitable ballast resistors in the same manner as taught for the anode 11. In an arrangement with similarly shaped copper end electrodes, either end can be made to operate as the cathode, and operation with alternating current is feasible.

What is claimed is:

1. A wind tunnel comprising a supersonic nozzle, an arc cathode on the upstream side of said nozzle, and an arc anode on the downstream side of said nozzle, said anode comprising a plurality of electrically conductive segments forming an annular configuration and electrically insulated from each other, said plurality of electrically conductive segments forming an annular configuration and electrically insulated from each other being effective to reduce heat concentration in said anode, said nozzle comprising a constrictor portion forming an elongated small diameter passage through which an arc between said cathode and said anode must pass, said elongated passage being of a uniform diameter.

2. A wind tunnel comprising a supersonic nozzle, an arc cathode on the upstream side of said nozzle, and an arc anode on the downstream side of said nozzle, said anode comprising a plurality of electrically conductive segments forming an annular configuration and electrically insulated from each other, said plurality of electrically conductive segments forming an annular configuration and electrically insulated from each other being effective to reduce heat concentration in said anode, said nozzle comprising a constrictor portion forming an elongated small diameter passage through which an arc between said cathode and said anode must pass, said elongated passage being of a uniform diameter, said constrictor portion comprising throughout its length a series of annular electrical insulating sections sandwiched between annular metal sections, said series of annular electrical insulating sections sandwiched between annular metal sections being effective to cause said arc to follow the path defined by said passage.

3. A wind tunnel comprising a supersonic nozzle, an arc cathode on the upstream side of said nozzle, and an arc anode on the downstream side of said tunnel, said nozzle comprising a constrictor portion forming an elongated passage through which an arc between said cathode and said anode must pass, said anode comprising a plurality of electrically conductive segments forming an annular configuration and electrically insulated from each other, said plurality of electrically conductive segments forming an annular configuration and electrically insulated from each other being effective to reduce heat concentration in said anode.

4. A wind tunnel as claimed in claim 3 and comprising a ballast resistance connected to each of said segments for providing a uniform arc current distribution among said segments.

5. A wind tunnel as claimed in claim 2 and comprising a ballast resistance connected to each of said segments for providing a uniform arc current distribution among said segments.

6. A wind tunnel as claimed in claim 1 and comprising a ballast resistance connected to each of said segments for providing a uniform arc current distribution among said segments.

7. A wind tunnel as claimed in claim 4 in which each of said segments is water cooled.

8. A wind tunnel as claimed in claim 5 wherein said nozzle comprises an effuser disposed between said constrictor and said anode.

9. A wind tunnel as claimed in claim 8 wherein said effuser comprises a series of annular electrical insulating sections sandwiched between annular metal sections.

10. A wind tunnel comprising an arc cathode, an arc anode spaced from said cathode, and means defining a passageway between said anode and said cathode for the passage of gas therebetween and the passage of an arc therebetween, said anode comprising a plurality of electrically conductive segments forming an annular configuration and electrically insulated from each other, said electrically conductive segments forming an annular configuration and electrically insulated from each other being effective to reduce heat concentration in said anode.

11. A wind tunnel as claimed in claim 10 and comprising a ballast resistance connected to each of said segments for providing a uniform arc current distribution among said segments.

12. A wind tunnel as claimed in claim 11 in which each of said segments is water cooled.

References Cited

UNITED STATES PATENTS

| 3,077,108 | 2/1963 | Gage et al. | 73—147 |
| 3,149,222 | 2/1964 | Giannini et al. | 219—121 |

FOREIGN PATENTS

| 1,219,762 | 12/1959 | France. | |

DAVID SCHONBERG, *Primary Examiner.*